ation Priority Data
United States Patent [19]
Kruger

[11] 3,716,036
[45] Feb. 13, 1973

[54] VALVE ACTUATING ASSEMBLY

[75] Inventor: Hermann Kruger, Wolfsburg, Germany

[73] Assignee: Volkswagenwerk Aktiengesellschaft

[22] Filed: Dec. 11, 1970

[21] Appl. No.: 97,186

[30] Foreign Application Priority Data

Dec. 13, 1969 Germany.....................P 19 62 631.4

[52] U.S. Cl..............................123/90.43, 123/90.46
[51] Int. Cl. ..............................F01l 1/18, F01l 1/24
[58] Field of Search.........................123/90.43, 90.46

[56] References Cited

UNITED STATES PATENTS

| 3,314,404 | 4/1967 | Thompson | 123/90.43 |
| 3,137,283 | 6/1964 | Sampietro | 123/90.43 |
| 1,930,568 | 10/1933 | Short | 123/90.43 |
| 2,865,353 | 12/1958 | Sampietro | 123/90.43 |
| 2,873,730 | 2/1959 | Kilgore | 123/90.43 |

*Primary Examiner*—Al Lawrence Smith
*Attorney*—Watson, Cole, Grindle & Watson

[57] ABSTRACT

An internal combustion engine valve actuating assembly in which a valve actuating lever is fulcrumed on telescopically associated piston and cylinder members jointly defining an expansible chamber for reception of pressurized fluid tending to relatively extend said members. The bearing or fulcrum of the lever is located between the opposite axial ends of the slidably interengaged areas or interface of the members to minimize the creation of torque and/or tilting forces by longitudinal thrust of the lever.

1 Claim, 4 Drawing Figures

PATENTED FEB 13 1973 3,716,036

INVENTOR
BY Hermann Krüger
Watson, Cole, Grindle & Watson

VALVE ACTUATING ASSEMBLY

The present invention relates to a valve actuating assembly more especially for internal combustion engines, containing a lever pivotally supported in a bearing for actuating the valves and a valve clearance resetting system associated therewith, having a cylinder receiving a pressure medium and a piston telescopically associated with the cylinder, the cylinder co-operating with the piston by means of a sliding track defined by their interengaged telescoping position. Such valve assemblies are known in which a substantially existing or subsequently occurring valve clearance is removed by use of hydraulic pressure for extending the pressure-impacted piston, movements of the piston in reverse direction due to any external forces being prevented by providing a non-return valve.

As has been found in known assemblies of this kind, force components transmitted by the lever to the bearing may have an adverse effect, which act at right angles to the sliding track, i.e., which exert a moment on the piston and the cylinder. To remedy this a long sliding track has been provided.

An object of the invention is to minimize the serious disadvantage of known valve assemblies with valve clearance adjustments by locating the bearing of the lever on the valve clearance resetting member so as to engage over the sliding track.

This simple measure which, as yet to be shown, also provides advantages from a constructional point of view which ensures that no torques occur within the valve clearance resetting member which tend to tilt the piston relative to the cylinder and relative to the sliding track. This advantageous effect of the measure is based on the fact that the effective lines of the force components, extending at right angles to the direction of the relative movement between the piston and cylinder, always intersect the mutual sliding track or interface of the piston and cylinder, so that they are unable to cause any torque within the assembly.

The cylinder can be made stationary and the piston located slidingly therein; the bearing for the lever then is formed by an extension engaging around the free end of the cylinder and extending outside thereof at least partially over the region of the piston. In this embodiment the free end of the cylinder projects substantially into an annular groove formed in the piston and which, in the region of the bearing for the lever, has to be provided with a larger outer diameter than they cylinder. A reverse arrangement is also possible; the piston is stationary and the cylinder mounted slidingly thereon. The bearing for the lever is then formed by a portion of the cylinder jacket extending over the region of the piston so that the cylinder moves relative to the stationary piston. The term "piston" and "cylinder" is not applied in accordance with the distinction between the movable part and the fixedly located part but, as the cylinder there is always denoted the part which forms a chamber for the pressure medium.

It is convenient for the supply of pressure medium to be provided by a passage through the fixedly located piston, to save using flexible pipes. The piston can be provided with suitable bores which will generally extend over the whole length of the piston, if the cylinder is permitted to form a pressure medium-filled chamber at the end of the valve resetting system remote from the fixing end of the piston.

At this point it is observed that it is self-evident that a valve, more especially a non-return valve, should be provided in the region of the pressure medium-filled chamber of the cylinder.

The embodiment described presents various constructional advantages, inasmuch as the valve clearance resetting system can be retained, even with a low overall height, below the lever bearing, as for example in a cylinder head of an internal combustion engine, since the cylinder forms the pressure medium-filled chamber in contrast to known assemblies where its end is remote from the fixing point. If this chamber is located at the upper end of the valve clearance resetting system and a liquid pressure medium is used, then the cylinder is provided at this upper end with apertures for gas emission. These apertures may simultaneously serve to cause a certain leakage flow of the liquid pressure medium.

The invention is not limited to the use of a hydraulic pressure medium but also permits the use of a gaseous or steam-like pressure medium. Generally, however, the characteristic of a liquid of being substantially incompressible, will have a favorable effect in this connection.

In a valve assembly such as is described above the bearing for the lever is formed as a ball joint.

The invention will now be described further, by way of example, with reference to the accompanying drawings, in which.

In the figures the valve *per se* and its actuating means are not shown as these are well known in the art.

Figure 1:
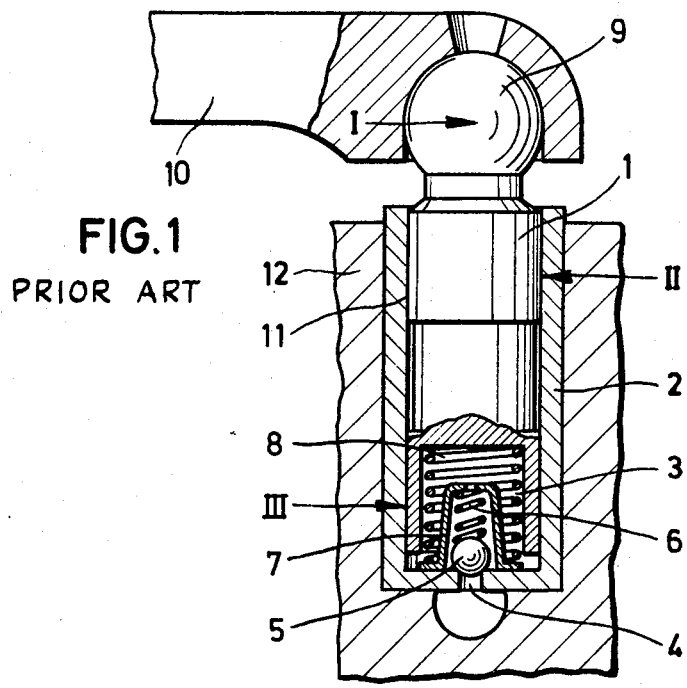
FIG. 1 is a fragmentary cross-section through a conventional valve assembly.

In the prior art, as shown in FIG. 1, a piston member 1 operates in a cylinder member 2, in the lower region of which there is a variable volume chamber 3 filled with a pressure medium, generally oil. A bore 4 serves to supply the pressure medium which is unable to escape due to the provision of a non-return valve formed by a ball 5, a compression spring 6 and a cap 7. The cap 7 is held down by a spring 8 which is of greater dimensions than the spring 6. The piston member 1 is provided with a bearing 9 at its upper end which projects substantially out of the cylinder member 2, the bearing being formed as a ball joint for a lever 10, which is a rocker or trailing lever, angularly movable in the axial plane of the telescopically associated members 1 and 2, by means (not shown) to actuate a valve.

As soon as the lever 10 transmits a force component 1 to the bearing 9 and hence to the piston 1 which is directed at right angles to a common sliding track 11 of piston 1 and cylinder 2 within the latter, a torque is exerted on the cylinder member 2 which tends to axially tilt the upper end of the member 2 about its lower end. This has to be compensated by a counter torque. The appertaining forces II and III act in opposite directions on the outer surfaces of the piston I, so that at II a force acts on the outer surface which, because of the mechanical advantage attained through exertion of the force I against the axially projecting bearing 9, is greater than the force I causing it. This at first becomes noticeable by a relatively high surface pressure in the upper region of the sliding track 11. Moreover, the torque caused by the force I results in a varied stressing of the different areas of the sliding track 11, since it tends to tilt the piston member 1 in the cylinder member 2. This in turn results in undesired local wearing of the sliding track 11.

In accordance with the present invention, these disadvantages are overcome by axially locating the bearing or pivotal connection between the lever and said other member between the opposite axial ends of the sliding track.

Figure 2:
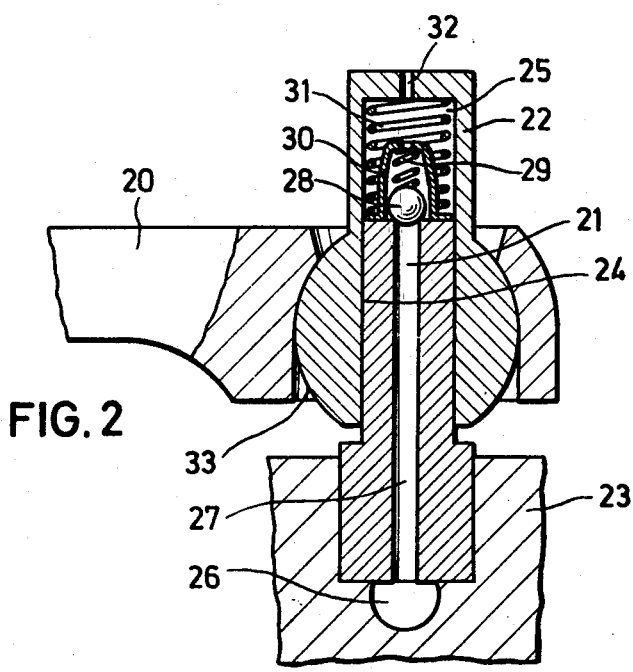
FIG. 2 is a fragmentary cross-section of a valve assembly, having a valve clearance resetting system constructed in accordance with the invention.

In the embodiment of the invention, shown in FIG. 2, a rocker or trailing lever 20 has a bifurcated or eyelet-like region engaging around a valve clearance resetting system. The resetting system substantially consists of a piston member 21, which moves inside a cylinder member 22, the piston member 21 being fixedly located at its end (shown at the bottom in the Figure) in a wall 23 of the cylinder head, whilst the cylinder member 22 of the system slides along a common sliding track 24 defined by the common area of telescoping engagement between the members 21 and 22.

The cylinder member 22 forms a pressure medium-filled variable volume chamber 25 in the region of its upper end remote from the fixedly supported lower end of the piston member 21 and serves to receive a non-return valve 28 of known type. The pressure medium is supplied through the wall 23 of the cylinder head via a passage 26 which is continued in a passage 27 within the piston member 21. A ball 28, which together with a compression spring 29 and a cap 30 having a passage aperture for pressure medium in its upper end, forms the non-return valve and is arranged in the upper end of the passage 27.

The cap 30 is held down by a spring 31. The bore 32 at the upper end of the cylinder serves as an outlet and also to ensure a small leakage flow of the pressure liquid used herein. The leakage flow may simultaneously act as lubrication for the bearing of the lever 20, when suitably arranged also to lubricate other sliding parts of the valve drive, such as cam surfaces.

The cylinder member 22 has a spherical outer jacket portion 33 and so forms a bearing in the form of a ball joint for the lever 20. The bearing 33 embraces the common sliding track 24 of piston 21 and cylinder 22, or in other words, is located between the opposite axial ends of the sliding track 24 to minimize transmission of tilting forces on the member 22 by lever 20.

Since the bearing 33 can transmit force components only acting at right angles on its surface and, moreover, since these force components are directed in a line intersecting the common sliding track 24 between the ends thereof, the transverse force causes no moments tilting the cylinder member 22 relative to the piston member 21.

Figure 3:
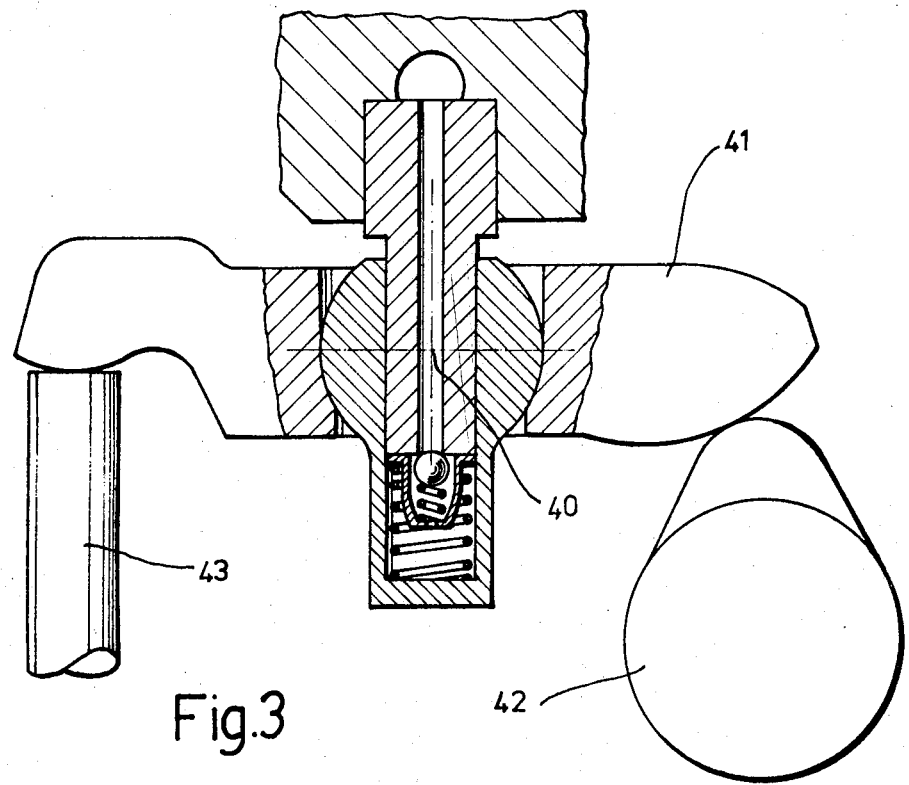
FIG. 3 is a section showing the use of a valve clearance resetting system with a rocker lever.

In the embodiment shown in FIG. 3 the same type of valve clearance setting system is used as in FIG. 2, so that it is not described in detail. The valve clearance system is associated with a pivotal axis 40 of a rocker lever 41, which transmits the force exerted by a cam shaft 42 to a valve control system 43. Naturally, the force exerted by the valve clearance resetting system has to be directed opposite the forces of 42 and 43 on the lever.

Figure 4:
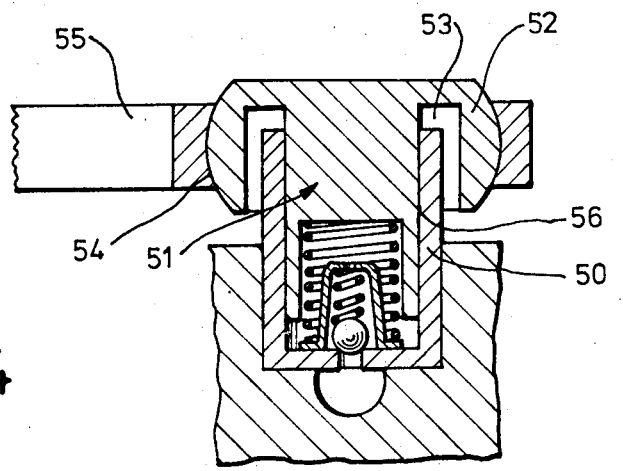
FIG. 4 is a section showing an alternative construction of valve clearance resetting system.

In the embodiment shown in FIG. 4 the known system of a piston member movable within a stationary cylinder member, is retained, but modified in such a manner that again transverse forces are directed in a line intersecting the common sliding track and consequently cannot exert any disturbing torques. For this purpose a piston member 51 slidingly mounted within a stationary cylinder member 50 is specifically formed.

It engages with a collar-like extension 52, which may be formed by an additional part connected to the piston member 51, around the free end of the cylinder member 50, so that this free end of the cylinder member extends substantially into an annular groove 53 of the piston member, the outer diameter of which is larger than that of the cylinder member. Further details of the piston cylinder arrangement correspond to those of the embodiments already described and are not shown in detail. The outer jacket surface of the extension 52 is constructed as a ball joint 54 to function as a bearing for a lever 55, which in eyelet-like and bifurcated formation engages over this arrangement. The ball bearing 54 is thus located in a region below which a common sliding surface 56 of piston member 51 and cylinder member 50 extends. This, in turn, ensures that no interfering torques can occur within the system owing to transverse forces transmitted from the lever 55 to the bearing.

While there are above disclosed but a limited number of embodiments of the invention, further embodiments will be obvious without departing from the inventive concept herein disclosed, and as defined in the appended claims.

Having thus described my invention, I claim:

1. Valve actuating assembly, especially for an internal combustion engine, comprising telescopically arranged piston and cylinder members jointly defining a variable volume chamber into which a fluid pressure medium is supplied through a non-return valve;
   said cylinder member being fixedly supported and said members having portions slideably engaging each other to form a sliding track within said cylinder member;
   a lever extending transversely to the cylindrical axis of said members;
   a bearing located axially on said piston member at least partly between the opposite axial ends of such sliding track,
   said bearing pivotally supporting said lever for rocking movement about said bearing in the plane of the cylindrical axis of said members to actuate a valve of the assembly, whereby to minimize tilting forces on said piston member arising from longitudinal thrust from said member to institute its rocking movement, said bearing being formed by an extension of said piston member engaging around the free end of said cylinder and extending outside thereof and at least partly over the sliding track region of said piston and said cylinder members.

* * * * *